March 27, 1934.  M. C. CARY ET AL  1,952,582
INSULATION TESTING APPARATUS
Filed July 18, 1930
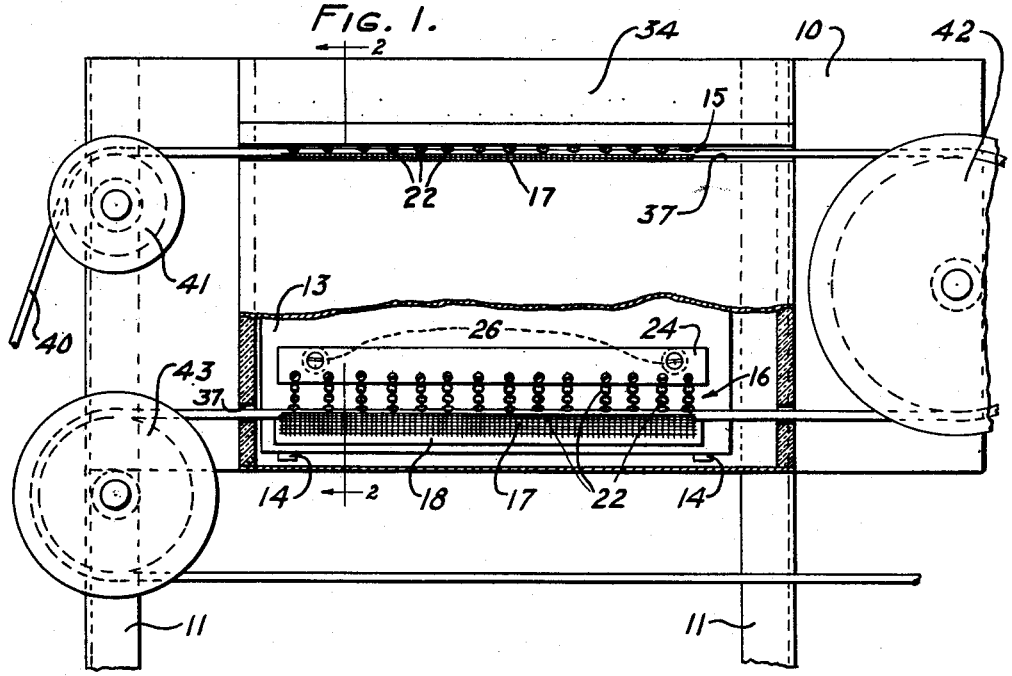
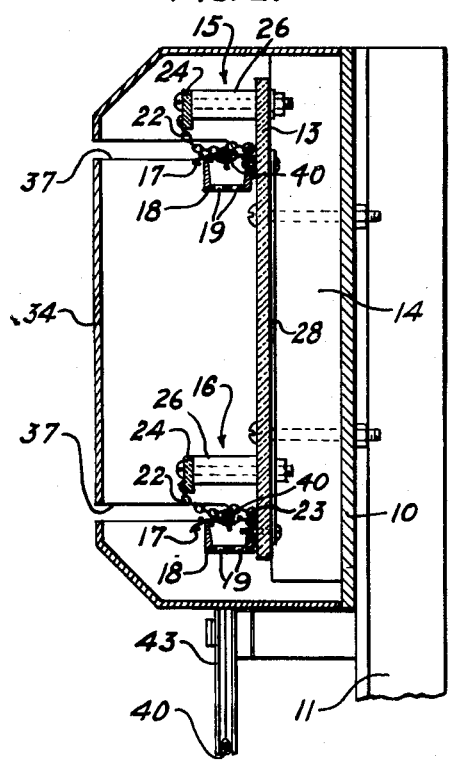
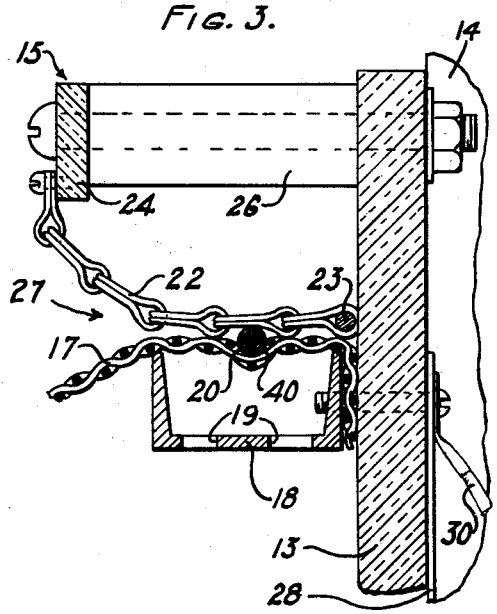
INVENTORS
M. C. CARY
W. M. HILL
BY E. R. Nowlan
ATTORNEY Patented Mar. 27, 1934

1,952,582

UNITED STATES PATENT OFFICE 1,952,582

INSULATION TESTING APPARATUS

Malcolm C. Cary and Walter M. Hill, Baltimore, Md., assignors to Western Electric Company, Incorporated, New York, N. Y., a corporation of New York Application July 18, 1930, Serial No. 468,874

15 Claims. (Cl. 175—183)

This invention relates to insulation testing apparatus, and more particularly to an apparatus for testing insulation on electrical conductors.

An object of the invention is to provide a testing apparatus of simple and inexpensive construction wherein an intimate contact with the material under test is maintained throughout the testing operation.

One embodiment of the invention contemplates the provision of an apparatus for testing insulation on electrical conductors, comprising a plurality of spaced depending flexible conducting elements disposed above a support illustrated as a metallic foraminous member or screen supported upon an inverted horizontal channel. The insulated conductor is passed between the screen and the flexible conducting elements, the latter cooperating with the screen to insure an intimate contact with the insulation throughout substantially the length of the apparatus. The flexibility of the depending conducting elements permits the free passage of lumpy or irregular insulation without interrupting the testing operation or damaging the insulation. The spaced arrangement of the depending conducting elements and the foraminous construction of the screen, contribute to prevent the accumulation of loose insulating material, dirt, or other foreign particles, thus insuring a close contact with the insulation under test.

Other features and advantages of the invention will become apparent from the following detailed description, reference being had to the accompanying drawing, wherein Fig. 1 is a front elevational view, partly in section, of an apparatus embodying the features of the invention;

Fig. 2 is an enlarged fragmentary section on line 2—2 of Fig. 1; and

Fig. 3 is an enlarged fragmentary vertical section through the upper testing unit of the apparatus.

As shown in the drawing, a supporting framework for the improved apparatus may consist of a mounting plate 10 secured to a pair of spaced vertical standards 11—11. A panel 13, is attached to the plate 10 and is spaced therefrom by a pair of spaced vertical strips 14—14. The panel 13 and the spaced strips 14 are composed of suitable insulating material, preferably phenol fibre. The testing units of the apparatus are mounted upon the panel 13 and, in the present embodiment of the invention, two of such units are illustrated electrically interconnected and designated generally by the numerals 15 and 16, respectively. This construction of the apparatus provides a compact arrangement wherein a continuous contact with the insulation of the conductor is maintained throughout a large portion of its length although it is not necessary to have more than a single testing unit. Since the testing units 15 and 16 of the apparatus are of the same construction, a detailed description of one of them will be sufficient to a complete understanding of the invention.

Each of the testing units 15 and 16 of the electrode comprises a foraminous metallic member illustrated as a metallic screen 17, preferably composed of galvanized steel wire mesh. This metallic member is supported in any suitable manner but is illustrated as being supported upon the flanges of an inverted horizontal channel 18 secured to the panel 13. One side of the metallic member is bent downwardly over the inner flange of the channel and is securely clamped between the channel and the insulating panel 13, as clearly shown in Fig. 3. The opposite side of the metallic member extends beyond the opposite flange of the channel and slopes downwardly for a purpose hereinafter described. The metallic member is formed with a trough like depression or groove 20 which extends longitudinally of the supporting channel 18 intermediate the flanges thereof.

Disposed above the metallic member 17 and extending transversely thereof are a plurality of spaced depending members of flexible conducting elements, such as metallic sash chains 22 or the like. The chains 22 are secured at one end to a metallic rod 23 electrically connected to the member 17 and are fastened at their opposite ends to an insulating strip 24 secured to the panel 13 and spaced therefrom by means of a plurality of insulating posts 26, 26. It will be observed that the inner end portions of the chains 22 normally rest upon the member 17 and the outer end portions thereof slope upwardly therefrom and thus cooperate with the downwardly sloped portion of the member 17 to provide a V-shaped mouth 27 (Fig. 3) for facilitating the insertion of the conductor between the member 17 and the cooperating chains. It will be obvious that the flexibility of the chains 22 permit the free passage of lumpy or irregular insulation without interrupting the testing operation or damaging the insulation. Also, the spaced arrangement of the chains and the foraminous construction of the member 17 contribute to prevent the accumultion of loose insulating material, dirt, etc., thus insuring a clean intimate contact with the insulation under test at all times. It will be understood that any loose material which becomes detached from the conductor during the testing operation will drop through the perforations of the member 17 upon the web portion of the channel 18. The web portion of the channel may be provided with a plurality of perforations 19 (Fig. 3) to prevent the accumulation of loose material thereon, thus providing a self cleaning apparatus.

The upper and lower testing units of the apparatus are electrically interconnected by means of a metallic strap or bus bar 28 which, in turn, may be connected to a suitable source of electrical current (not shown) by means of a conductor 30. A removable guard or housing 34 cooperates with the plate 10 to enclose the upper and lower testing units of the apparatus. The guard is provided with spaced slots 37—37 whereby the conductor may be threaded through the upper and lower testing units of the apparatus without removing the guard. Grooved wheels 41, 42 and 43, composed of insulating material, are provided for guiding the conductor through the upper and lower testing units of the apparatus.

It is believed that the operation of the improved testing apparatus will be clearly understood from the above description. The insulated conductor to be tested, which may consist of a rubber insulated wire 40, is threaded over the guide wheels 41, through the upper testing unit 15, around the guide wheel 42, through the lower testing unit 16 and then around the guide wheel 43 to a suitable take-up means (not shown). The construction and arrangement of the members 17 and the depending loops 22 permit the insertion of the insulated wire laterally between the member 17 and the depending conducting elements, thus facilitating the threading of the wire through the upper and lower testing units of the testing apparatus.

The upper and lower testing units of the apparatus and the inner and outer ends of the conductor under test are connected in a well known manner in an electrical circuit including a signaling device and a source of high potential current. The circuit arrangement may be such that when a defective portion of insulation passes through the upper or lower testing units of the apparatus, an electrical current will bridge the gap between the conductor and the testing unit, due to the dielectric strength of the defective insulation being insufficient to withstand a high potential, and thereby complete an electrical circuit for operating the signaling device to notify the operator that the insulation is defective. The improved construction of the apparatus insures a continuous intimate contact with the insulation of the conductor under test throughout a large portion of its length.

It is to be understood that the embodiment of the invention herein illustrated and described merely represents one useful application of the invention which is capable of modifications and numerous other applications within the scope of the appended claims.

What is claimed is:

1. A testing unit for testing insulation on a conductor, comprising a support, a foraminous electrical conducting member carried by the support and a flexible conducting element having a portion yieldably engaging the foraminous member and the conductor to be tested.

2. In a testing apparatus, a testing unit, comprising a support including a channel member, and a foraminous electrical conducting member extending across the flanges of the channel.

3. In a testing apparatus, a testing unit, comprising a support having an angle portion, and a foraminous electrical conducting member engaging an edge of one side of the angle portion and having a portion spaced from another side thereof.

4. In a testing apparatus, a testing unit, comprising a support including an inverted horizontal channel having spaced flanges and an inter-connecting perforated web portion, and a metallic screen supported upon the flanges of the channel and spaced from the web portion thereof.

5. A testing unit for testing insulation on a conductor, comprising a support, a metallic screen carried by said support, and a flexible conducting element electrically connected to the screen and having a portion yieldably engaging said screen.

6. A testing unit for testing insulation on an electrical conductor, comprising a support, a foraminous electrical conducting member carried by the support for contacting with said conductor, and a plurality of spaced flexible conducting elements disposed transversely with respect to the foraminous member and having portions yieldably engaging the foraminous member and said conductor.

7. In a testing apparatus, a testing unit, comprising a support including a horizontal channel member, a metallic screen supported upon the channel, and a plurality of depending loops of flexible conducting elements having portions yieldably engaging the screen.

8. In a testing apparatus, a testing unit for testing insulation on a moving conductor, comprising a support, and a foraminous electrical conducting member carried by the support and having a groove for engaging and guiding the moving conductor.

9. In a testing apparatus, a testing unit for testing insulation on a conductor, comprising a foraminous electrical conducting member for engaging the insulation, and a flexible element having a portion yieldably engaging the conductor for maintaining it in contact with the foraminous member.

10. In a testing apparatus, a testing unit for testing insulation, comprising a foraminous electrical conducting member, and means for maintaining the member in yieldable engagement with the insulation.

11. In a testing apparatus, a testing unit, comprising a horizontal metallic screen, and a plurality of spaced depending loops of flexible electrical conducting elements extending transversely of the screen, electrically connected thereto and having portions yieldably engaging the screen.

12. In a testing apparatus, a testing unit for testing insulation on a conductor, comprising a horizontal metallic screen having a longitudinally extending groove for engaging and guiding the insulated conductor, and a plurality of depending loops of metallic link chains extending transversely of the groove, electrically connected to the screen and having portions yieldably engaging the screen adjacent both sides of the groove.

13. In a testing apparatus, a testing unit for testing insulation on a conductor, comprising a horizontal electrical conducting foraminous member, and a plurality of depending loops of flexible elements yieldably engaging the foraminous member and extending transversely thereof, the foraminous member having a downwardly sloped portion for facilitating the insertion of the insulated conductor, between the member and the flexible depending elements.

14. A testing unit for electrically testing insulated wire, comprising a supporting electrical conducting member, and an electrical conducting link element having portions yieldably contacting with said supporting member and the wire to be tested.

15. A testing unit for electrically testing insulated wire, comprising a rigid trough-like member provided with perforations to permit passage of loose materials therefrom, and flexible conducting elements having portions yieldably contacting with the trough-like member and the wire to be tested.

MALCOLM C. CARY.
WALTER M. HILL.